United States Patent
Kafka et al.

(10) Patent No.: US 8,477,758 B2
(45) Date of Patent: Jul. 2, 2013

(54) VOICE OVER NETWORK (VON)/VOICE OVER INTERNET PROTOCOL (VOIP) ARCHITECT HAVING HOTLINE AND OPTIONAL TIE LINE

(75) Inventors: Henry J. Kafka, Atlanta, GA (US); Maria Adamczyk, Alpharetta, GA (US); Frederick C. Iffland, Dunwoody, GA (US); Anita Hogans Simpson, Decatur, GA (US); Stephen R. LaPierre, Union City, GA (US); Karen M. McCourt, Alpharetta, GA (US); John Paul Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1611 days.

(21) Appl. No.: 11/119,109

(22) Filed: Apr. 29, 2005

(65) Prior Publication Data

US 2005/0190750 A1    Sep. 1, 2005

Related U.S. Application Data

(63) Continuation-in-part of application No. 10/024,135, filed on Dec. 21, 2001, now Pat. No. 7,391,761.

(60) Provisional application No. 60/569,504, filed on May 7, 2004, provisional application No. 60/615,922, filed on Oct. 5, 2004.

(51) Int. Cl.
*H04L 12/50* (2006.01)

(52) U.S. Cl.
USPC ....... 370/352; 379/212.01; 370/220; 370/401

(58) Field of Classification Search
USPC .................................................. 370/352–356
See application file for complete search history.

(56) References Cited

U.S. PATENT DOCUMENTS

| | | | |
|---|---|---|---|
| 4,935,951 A | 6/1990 | Robinson et al. |
| 4,993,058 A | 2/1991 | McMinn et al. |
| 5,012,507 A | 4/1991 | Leighton et al. |
| 5,161,180 A | 11/1992 | Chavous |
| RE34,677 E | 7/1994 | Ray et al. |
| 5,511,111 A | 4/1996 | Serbetcioglu et al. |
| 5,526,406 A | 6/1996 | Luneau |
| 5,621,379 A | 4/1997 | Collins |
| 5,673,304 A | 9/1997 | Connor et al. |

(Continued)

OTHER PUBLICATIONS

U.S. Appl. No. 11/089,296.

(Continued)

*Primary Examiner* — Duc Nguyen
*Assistant Examiner* — Ibraham Sharifzada
(74) *Attorney, Agent, or Firm* — Myers Bigel Sibley & Sajovec, P.A.

(57) ABSTRACT

Voice service over a next generation network is provided using Advanced Intelligent Network solutions. According to an exemplary embodiment, a Voice over Network system includes a communications device having a directory communication address in communication with a telecommunications network, means for decoding the directory communications address to identify a voice over internet protocol service feature of the communications address, and means for establishing an internet protocol telephony communications connection of the communications device with a called party's communications address via a VoN hotline. According to further exemplary embodiments, the hotline may include a media gateway, an application server, a feature server, and means for communicating among the media gateway, the application server, and the feature server.

17 Claims, 11 Drawing Sheets

U.S. PATENT DOCUMENTS

| | | | |
|---|---|---|---|
| 5,724,412 | A | 3/1998 | Srinivasan |
| 5,796,806 | A | 8/1998 | Birckbichler |
| 5,805,587 | A | 9/1998 | Norris et al. |
| 5,883,942 | A | 3/1999 | Lim et al. |
| 5,940,474 | A | 8/1999 | Ruus |
| 5,940,475 | A | 8/1999 | Hansen |
| 6,009,148 | A | 12/1999 | Reeves |
| 6,011,473 | A | 1/2000 | Klein |
| 6,104,800 | A | 8/2000 | Benson |
| 6,144,644 | A | 11/2000 | Bajzath et al. |
| 6,208,718 | B1 | 3/2001 | Rosenthal |
| 6,208,726 | B1 | 3/2001 | Bansal et al. |
| 6,215,784 | B1* | 4/2001 | Petras et al. ............ 370/356 |
| 6,219,413 | B1 | 4/2001 | Burg |
| 6,259,692 | B1 | 7/2001 | Shtivelman |
| 6,307,920 | B1 | 10/2001 | Thomson et al. |
| 6,310,946 | B1 | 10/2001 | Bauer et al. |
| 6,330,244 | B1 | 12/2001 | Swartz et al. |
| 6,343,115 | B1 | 1/2002 | Foladare et al. |
| 6,347,136 | B1 | 2/2002 | Horan |
| 6,356,756 | B1 | 3/2002 | Koster |
| 6,363,065 | B1 | 3/2002 | Thornton et al. |
| 6,434,126 | B1 | 8/2002 | Park |
| 6,442,609 | B1 | 8/2002 | Lambert et al. |
| 6,476,763 | B2 | 11/2002 | Allen, Jr. |
| 6,480,581 | B1 | 11/2002 | Wa et al. |
| 6,529,500 | B1 | 3/2003 | Pandharipande |
| 6,603,977 | B1 | 8/2003 | Walsh et al. |
| 6,608,886 | B1 | 8/2003 | Contractor |
| 6,614,781 | B1 | 9/2003 | Elliott et al. |
| 6,622,016 | B1 | 9/2003 | Sladek et al. |
| 6,624,754 | B1 | 9/2003 | Hoffman et al. |
| 6,650,901 | B1* | 11/2003 | Schuster et al. ............ 455/456.1 |
| 6,661,785 | B1 | 12/2003 | Zhang et al. |
| 6,665,293 | B2 | 12/2003 | Thornton et al. |
| 6,665,388 | B2 | 12/2003 | Bedingfield |
| 6,665,611 | B1 | 12/2003 | Oran et al. |
| 6,674,745 | B1 | 1/2004 | Schuster et al. |
| 6,678,357 | B2 | 1/2004 | Stumer et al. |
| 6,680,998 | B1 | 1/2004 | Bell et al. |
| 6,690,675 | B1* | 2/2004 | Kung et al. ............ 370/401 |
| 6,703,930 | B2 | 3/2004 | Skinner |
| 6,704,305 | B2 | 3/2004 | Emerson, III |
| 6,718,021 | B2 | 4/2004 | Crockett et al. |
| 6,763,020 | B1 | 7/2004 | Hon |
| 6,771,742 | B2 | 8/2004 | McCalmont et al. |
| 6,792,081 | B1 | 9/2004 | Contractor |
| 6,804,338 | B1 | 10/2004 | Chen |
| 6,842,448 | B1 | 1/2005 | Norris et al. |
| 6,868,074 | B1 | 3/2005 | Hanson |
| 6,885,660 | B2 | 4/2005 | Inbar et al. |
| 6,912,399 | B2 | 6/2005 | Zirul et al. |
| 6,940,950 | B2 | 9/2005 | Dickinson et al. |
| 6,954,454 | B1 | 10/2005 | Schuster et al. |
| 7,035,250 | B2 | 4/2006 | Lai et al. |
| 7,092,380 | B1 | 8/2006 | Chen et al. |
| 7,257,387 | B2 | 8/2007 | Laliberte |
| 7,376,129 | B2 | 5/2008 | Acharya et al. |
| 2001/0005372 | A1 | 6/2001 | Cave et al. |
| 2001/0043684 | A1 | 11/2001 | Guedalia et al. |
| 2002/0059374 | A1 | 5/2002 | Nuestro |
| 2002/0072348 | A1 | 6/2002 | Wheeler et al. |
| 2002/0101860 | A1 | 8/2002 | Thornton et al. |
| 2002/0131402 | A1* | 9/2002 | Lee et al. ............ 370/352 |
| 2002/0145973 | A1* | 10/2002 | Shah et al. ............ 370/220 |
| 2002/0160745 | A1 | 10/2002 | Wang |
| 2002/0188744 | A1* | 12/2002 | Mani ............ 709/231 |
| 2003/0211839 | A1 | 11/2003 | Baum et al. |
| 2003/0216148 | A1 | 11/2003 | Henderson |
| 2004/0037403 | A1 | 2/2004 | Koch |
| 2004/0057425 | A1 | 3/2004 | Brouwer et al. |
| 2004/0101123 | A1 | 5/2004 | Garcia |
| 2004/0140928 | A1 | 7/2004 | Cleghorn |
| 2004/0264439 | A1 | 12/2004 | Doherty et al. |
| 2005/0047574 | A1 | 3/2005 | Reid |
| 2005/0063519 | A1 | 3/2005 | James |
| 2005/0074111 | A1* | 4/2005 | Hanson et al. ............ 379/212.01 |
| 2005/0151642 | A1 | 7/2005 | Tupler et al. |
| 2005/0175166 | A1 | 8/2005 | Welenson et al. |
| 2005/0190750 | A1 | 9/2005 | Kafka |
| 2005/0190892 | A1 | 9/2005 | Dawson et al. |
| 2005/0232243 | A1 | 10/2005 | Adamczyk et al. |
| 2005/0249195 | A1 | 11/2005 | Simpson |
| 2005/0250468 | A1 | 11/2005 | Lu |

OTHER PUBLICATIONS

"VoIP Patent Applied for," Techweb News, Author and Date Unknown, p. 1.

"Bells Ringing in Net Phone 911," CNET News.com by Ben Charny, staff writer, *Daily Clips*, Mar. 7, 2005, pp. 1-2.

"VoIP Emergency Calling Services," Intrado Informed Responses, 2003, Author Not Available, Intrado Inc., Longmont, Colorado, USA pp. 1-2.

"BellSouthE911 Service Interfaces to Customer Premises Equipment at a Public Safety Answer Point," Technical Reference, Issue 6, TR73528, Apr. 2001.

"The Development of 9-1-1," http://www.sorc911.com/9-1-1-%20History.htm. May 21, 2004.

"FCC Addresses VoIP 911 Calls," BellSouth NewsSource from Staff and News Services, by Russell Grantham, May 8, 2005, p. 1.

"AG Files Suit Against Vonage Over 911," BellSouth NewsSource, by Ted Gotsch, May 5, 2005, pp. 1-2.

"FCC Boss Pushes 911 Plan," BellSouth NewsSource from Staff and News Services, by Renee Degross, Apr. 28, 2005, pp. 1-2.

"Helpless in a 911 Emergency: Some Internet Phone Services Leave Consumers Without a Lifeline," Newsday, Richard J. Dalton, Jr., May 11, 2005, pp. 1-3.

"Tests Show Many Cellphone Calls to 911 Go Unlocated," The Wall STreet Journal, by Anne Marie Squeo, May 19, 2005, pp. 1-3.

FCC to Rule on 911 Access for Web Phones, Washington Post, by Yuki Noguchi, Washington Post Staff Writer, May 18, 2005, pp. 1-3.

BellSouth Clarifies View on VoIP '911' Availability, TR Daily, by Lynn Stanton, May 17, 2005, p. 1.

"Level 3 Communications Sees 911 as its Edge in Internet Telephony," by Heather Draper, Dow Jones Newswires, Jun. 29, 2005, pp. 1-2.

"VoIP Patent Applied for", Techweb News, Author and Date Unknown, p. 1.

"Bells Ringing in Net Phone 911", CNET News.com by Ben Charny, staff writer, *Daily Clips*, Mar. 7, 2005, pp. 1-2.

"VoIP Emergency Calling Services," Intrado Informed Responses, 2003, Author Not Available, Intrado Inc., Longmont, Colorado, USA, pp. 1-2.

"BellSouth E911 Service Interfaces to Customer Premises Equipment at a Public Safety Answering Point", Technical Reference, Issue 6, TR73528, Apr. 2001.

"The Development of 9-1-1", http://www.sorc911.com/9-1-1-%20History.htm, May 21, 2004.

U.S. Appl. No. 10/024,135, filed Dec. 2001.

U.S. Appl. No. 11/318,110, filed Dec. 2005.

US 5,905,788, 05/1999, Bauer et al. (withdrawn)

\* cited by examiner

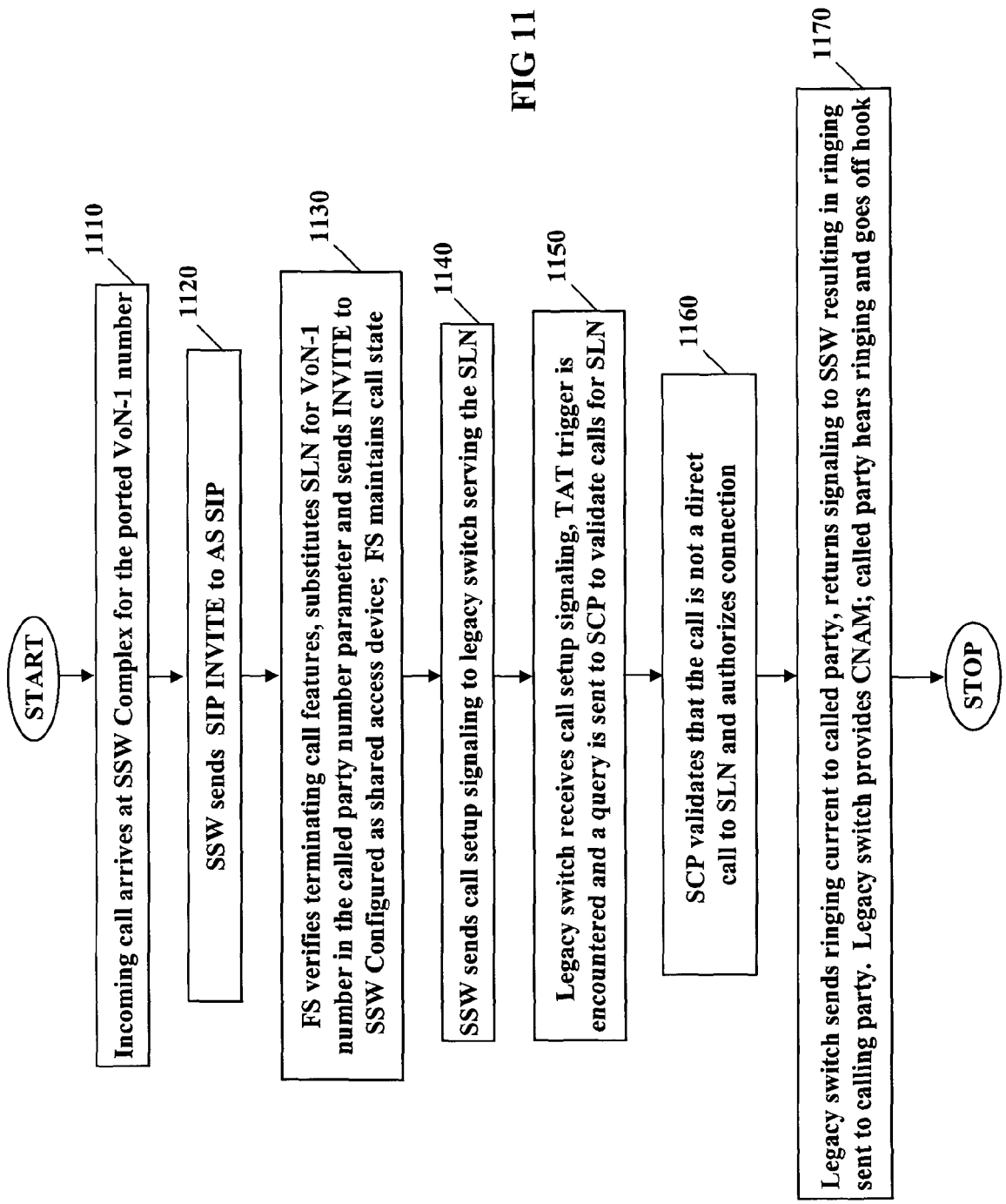

VOICE OVER NETWORK (VON)/VOICE OVER INTERNET PROTOCOL (VOIP) ARCHITECT HAVING HOTLINE AND OPTIONAL TIE LINE

CROSS REFERENCE TO RELATED APPLICATIONS

This application is a continuation-in-part of commonly assigned U.S. patent application Ser. No. 10/024,135 filed on Dec. 21, 2001 now U.S. Pat. No. 7,391,761, and of which is incorporated herein by this reference.

This application also claims the benefit of applicants' co-pending U.S. Provisional Application No. 60/569,504 filed on May 7, 2004 of which is incorporated herein by reference.

This application further claims the benefit of applicants' co-pending U.S. Provisional Application No. 60/615,922 filed on Oct. 5, 2004, and of which is incorporated herein by reference.

Additionally, this application relates to a commonly assigned co-pending U.S. patent application Ser. No. 11/133,670, entitled "Voice over Network(VoN)/Voice Over Internet Protocol (VoIP) Architect Using Advanced Intelligent Network Alternatives,"filed on May 20, 2005, and of which is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments relate to communications, and more specifically, to methods and systems for delivery of voice service over a data communications network and/or a telecommunications network.

Internet telephony, also referred to herein as Voice Over Internet Protocol (VoIP), Voice over Network (VoN), Internet. Protocol Telephony (IP Telephony), and others, is experiencing explosive growth and marked improvements in reliability and sound quality. The improved Internet telephony communications are, in large part, due to upgrading the internet backbone with better switching fabrics, such as Asynchronous Transfer Mode (ATM), and also due to implementation of new communications standards, such as standards for transport protocols, directory services, and/or audio codec format.

Along with these improvements come new challenges for the industry. For example, to support a voice communications path within a customer's premise (e.g., a customer's home or business) through a telephony communications path (e.g., DSL) with a data communications network, some combination(s) of integrated access devices (IAD), analog terminal adaptors (ATA), and/or telephone adapters (TA) must be installed at the customer's premise. For example, the customer may connect an existing analog phone (e.g., Plain Old Telephone Service (POTS) phone), including a cordless telephone, to the ATA or TA to originate and receive calls over a VoN line. A VoN dial-tone is provided to all telephone extensions connected with a TA. This VoN communications connection may include various hardware and equipment, such as, for example, soft switches (SSW), trunk gateways (TGWs), application servers (AS), routing engines and policy servers, media servers (MS), and feature servers (FS), such as applications, routing engines, and policy servers.

Although the VoN service is attractive, customers typically are not willing to spend a lot of money on new equipment. Moreover, customers are not willing to accept typical data communications network (e.g., Internet) or power outages and unpredictability of these outages when it comes to VoN services.

And, problems exist for communications service providers. From an Internet Service Provider's (ISP) perspective (i.e., provider for data communications network services), ISPs would like to avoid professional installation thus minimizing their payback period and increasing their Return-On-Investment (ROI). From a local exchange carrier's perspective (i.e., telephone service provider), it is important to re-use as much of the existing communications network that they have in place today for VoN lines. This maximizes efficiency of the existing telecommunications network. And, this also minimizes training and capital expenses. For example, a maintenance procedure such as MLT (mechanized loop test) may be used to test and analyze a communications path with the customer's premise, and these types of procedures are already well known by repair personnel.

Accordingly, a need exists for methods and systems that enable a customer to enjoy the convenience and potential cost savings of a VoN system using their analog phone or other existing communications device (e.g., computer, VoIP phone, etc.) while ensuring a quality of service voice connection over the VoN. Furthermore, a need exists for methods and systems that minimize service providers' costs and leverage the assets of existing communications networks.

SUMMARY

According to exemplary embodiments, the needs described above and other needs are met by methods, systems, computer programs, and computer program products to deliver voice service over a next generation network that includes a telecommunications network and/or a data communications network. According to exemplary embodiments of this invention, methods and systems deliver voice service over VoN, such as a network that includes the Public Switched Communications Network (PSTN) and an Internet Protocol (IP) network. Advantages include (1) eliminating VoN customer premises equipment (CPE), (2) eliminating installation of the equipment at the customer's premises, (3) reducing cost proposition to the end user, (4) using a local loop (instead of DSL or other means) to connect customer premise POTS and/or analog telephones to VoN service, and thereby, minimizing outages, and (5) re-using MLT procedures for VoN lines, and, thereby reducing training costs of technicians.

According to an exemplary embodiment, a method for Voice over Network services includes decoding a Voice over Network setup communications signal to associate an internal communications address with a directory communications address (e.g., POTS telephone number), and establishing a Voice over Network hotline for the communications address. The method may continue with presenting a dial tone to a communications device of the directory communications address, receiving a called party's communications address from the directory communications address (e.g., the dialed digits), and initiating a Voice over Network communications signal to the called party's communications address from the hotline.

According to another exemplary embodiment, a Voice over Network system includes a communications device having a directory communication address in communication with a telecommunications network, and means for identifying an off-hook state of the communications device and for decoding the directory communications address to identify a voice over internet protocol service feature of the directory communications address. Further, the telecommunications network communicates with a Voice over Network hotline to provide the voice over internet protocol service feature, and the Voice over Network hotline communicates the internet protocol telephony communications signals. Furthermore, the hotline provides means for establishing an internet protocol telephony communications connection of the communications device with a called party's communications address. According to further exemplary embodiments, a telecommunications switching device may be used as the means for identifying the off-hook state of the communications device and for decoding the directory communications address to identify the voice over internet protocol service feature of the communications address. Still further, the hotline may include a media gateway, an application server and/or a feature server, a media server, and means for communicating between the media gateway and the application server or the feature server.

Yet other exemplary embodiments describe computer program products to perform the methods and enable the systems described above. For example, an embodiment describes a storage medium on which is encoded instructions for decoding a Voice over Network setup communications signal to associate an internal communications address with a directory communications address, establishing a Voice over Network hotline for the directory communications address, presenting a dial tone to a communications device of the directory communications address, and/or receiving a called party's communications address from the directory communications address. The exemplary embodiment may further include a storage medium on which is encoded further instructions for initiating a Voice over Network communications signal to the called party's communications address from the hotline and for establishing the Voice over Network communications signal from the directory communications address to the called party's communications address via the Voice over Network hotline.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the present invention.

DESCRIPTION OF THE DRAWINGS

The above and other embodiments, objects, uses, advantages, and novel features are more clearly understood by reference to the following description taken in connection with the accompanying figures, wherein:

FIG. 11 illustrates a flow chart for an incoming call to a central office hotline with direct tie line functionality according to some of the exemplary embodiments of this invention.

DESCRIPTION

Figure 1:
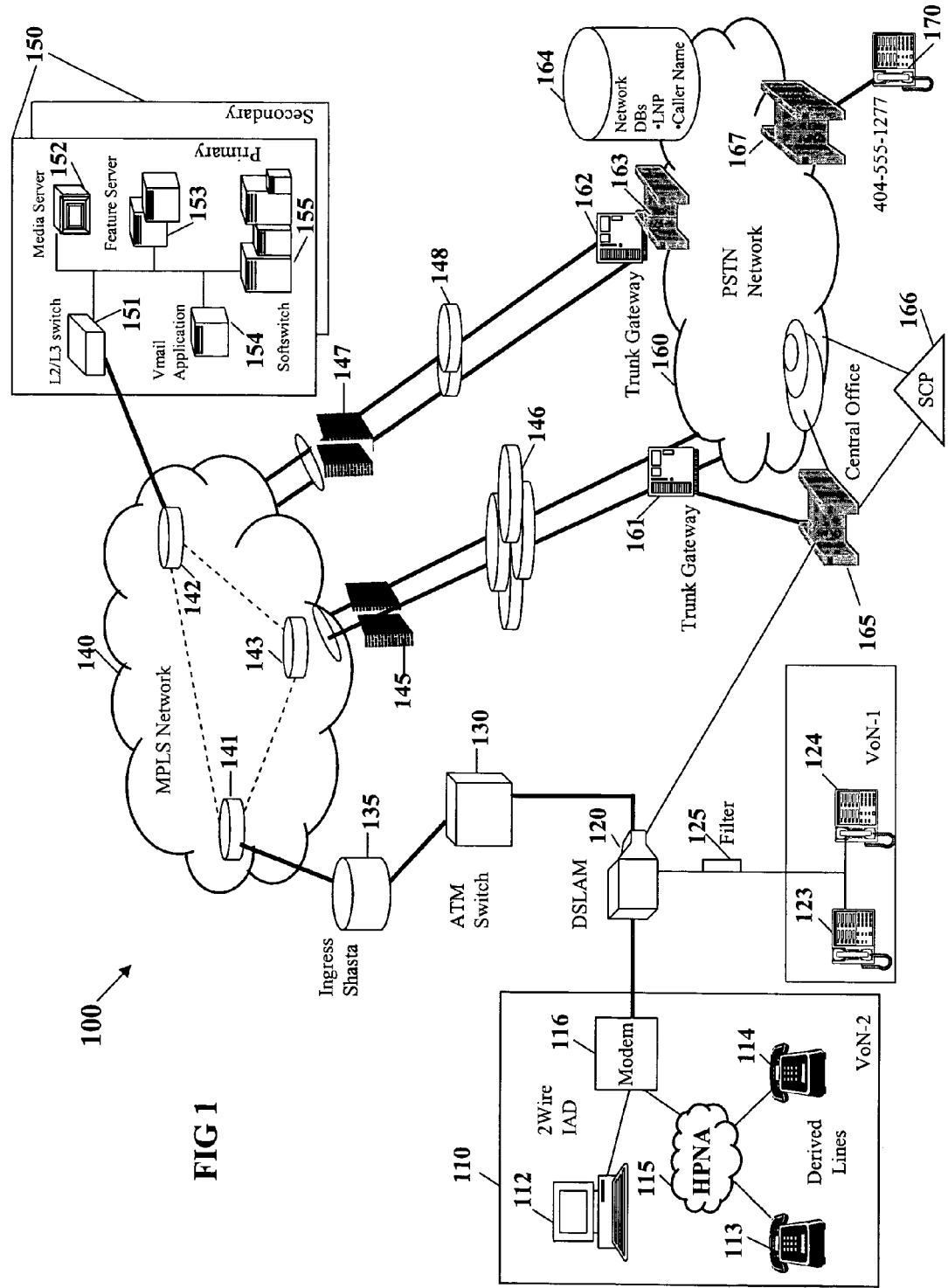
FIG. 1 an exemplary VoN/VoIP operating environment according to some of the embodiments of this invention.

Exemplary embodiments of this invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, systems, methods, and computer program products deliver voice communication signals via a next generation network, such as a VoN/VoIP communications network. This delivery of voice communication signals is often referred to as "VoN service for voice communications" throughout this patent document. According to exemplary embodiments of this invention, several VoN architects provide means for receiving and sending voice communications from an analog phone (e.g., Plain Old Telephone System (POTS) phone) as well as from alternate voice communications devices (e.g., personal computer, VoIP phone, etc.). Some of the advantages of this invention include (1) eliminating VoN customer premises equipment (CPE), (2) eliminating installation at the customer's premises, (3) reducing costs to the end user, (4) using the local telecommunications loop (instead of DSL) to connect customer premise hardware and equipment to VoN service, and thereby, minimizing communications outages (e.g., power, availability, and so on), and (5) re-using existing line testing procedures for VoN lines, and, thereby reducing training costs of technicians.

Table 1 below presents high level architectural overviews for VoN service for voice communications according to some of the exemplary embodiments.

TABLE 1

Exemplary VoN Architectures for Voice Communications

| VoN Architecture Title | VoN Architecture Description |
|---|---|
| CO HOTLINE & NGN AS/FS ENHANCED WITH LINE GATEWAY FUNCTIONALITY | 1. Originating calls routed to application server (AS) platform via "hotline" on Class 5 switch
2. Terminating calls routed from service node complex (SSW) to Class 5 switch
3. FS and/or AS enhancements provide subset of line gateway functions via TGW
4. Use existing TGW & SSW routing, that is the SSW routes to a Secret Line Number or Shadow Line Number (SLN) known by the Central Office (CO), FS, and AS
*Note: Mechanized Loop Testing (MLT) function sustained |
| CO HOTLINE CONNECTION TO DIRECT TIE LINE | 1. Originating calls routed to AS Platform via "hotline" to direct tie line to TGW
2. Terminating Calls routed from SSW complex to Class 5 switch
3. Modification to direct tie line service to allow customer to connect to TGW without dialing digits. TGW provides tie line function that enables SSW Complex to control the application of dial tone, digit collection, and switch-hook flash recognition. Optionally, CO switch may communicate originator's CgPN (SLN or VoN communications address) for routing purposes.
4. Use existing TGW & SSW routing (SSW routes to SLN in CO)
*Note: MLT function sustained |

Table 2 below presents an overview of Secret Line Number or Shadow Line Number (SLN) call flows for the above identified VoN service for voice communications according to some of the exemplary embodiments.

TABLE 2

SLN Call Flows

| SLN | CO HOTLINE & NGN AS ENHANCED WITH LINE GATEWAY FUNCTIONALITY | CO HOTLINE CONNECTION TO DIRECT TIE LINE |
|---|---|---|
| Originating Calls SLN | Outgoing calls:<br>1. Class 5 hotlines to SSW.<br>2. Class 5 identifies CgPN = SLN | Outgoing calls:<br>1. Class 5 hotlines to SSW.<br>2. Class 5 identifies CgPN = SLN |
| Receiving Calls | Incoming calls:<br>1. SSW complex receives session initiation protocol (SIP) invite for incoming call to VoN # (ported POTS number)<br>2. FS (and/or AS) sends SIP invite to SSW with Called Party Number (CdPN) = SLN<br>3. FS (and/or AS) maintains a communications connection (i.e., stays in) with the call<br>4. TGW routes to Class 5 switch serving SLN; Class 5 switch has feature to limit calls SLN to only calls from SSW complex | Incoming calls:<br>1. SSW complex receives SIP invite for incoming call to VoN # (ported POTS number)<br>2. FS (and/or AS) sends SIP invite to SSW with CdPN = SLN<br>3. FS (and/or AS) maintains a communications connection (i.e., stays in) with the call<br>4. TGW routes to Class 5 switch serving SLN; Class 5 switch has feature to limit calls SLN to only calls from SSW complex |

According to some exemplary embodiments, methods and systems of VoN for voice communications utilize a next generation softswitch, referred to as a softswitch (SSW) controlled line, to connect an analog phone on conventional home wiring (e.g., copper) to the VoN service for voice communications. Consequently, no telephone adapters (TA) need to be installed at customer's premises. Further, the VoN line is provided by the telecommunications service provider's central office and is controlled by the SSW, thus designing the SSW to operate as a network TA.

According to additional exemplary embodiments of this invention, methods and systems of VoN for voice communications utilize an IP phone and/or a TA phone per each phone extension at a customer's premise. Consequently, no telephone adapters (TA) need to be installed or used at the customer's premise. And while an integrated access device (IAD) or a Residential Gateway may be available to the customer's premise, the IAD or residential gateway is not used. That is, voice calls are routed through either the Class 5 switch or via an xATA. The Plain Old Telephone System (POTS) number (e.g., an analog communications address of the phone) is ported to VoN (e.g., a calling party number (CgPN)) and a secret line number is created and only known by selected network elements (e.g., a called party number (CdPN)).

Referring now to the figures, FIG. 1 illustrates an exemplary VoN operating environment. An operating system 100 may include customer premises hardware and equipment 110 including a home communications network, such as a home phone line networking alliance (HPNA), connecting analog phones 113 and 114 and a modem 116 and a personal computer 112. The operating system 100 further includes a digital subscriber line access multiplexer (DSLAM) 120 (e.g., a DSL equivalent of a CODEC), a filter 125 connected with other analog phones 123 and 124 (sometimes referred to as "VoN-1"), an ATM switch 130, and a gateway 135 communicating with a data communications network (referred to as the "MPLS" network) 140 having additional gateways 141, 142, and 143. The data communications network 140 communicates with the softswitch (SSW) complex 150 having an L2/L3 switch 151 connected with a Media Server (MS) 152, a Feature Server (FS) 153, a voicemail application 154, and an Application Server (AS) 155 (also referred to herein as a "softswitch" or "SSW"). The data communications network 140 further communicates with a telecommunications network 160 (e.g., a PSTN) and communications may be routed via firewalls 145 and 147, additional gateways 146 and 148, trunk gateway (TGW) 161, and another trunk gateway (TGW) 162 in tandem with a central office 163. The telecommunications network 160 includes at least one central office 163, 165, and 167 and at least one database 164. Further, the telecommunications network 160 connects a central office 165 and service control point (SCP) 166 with the analog phones 123 and 124 and other customer premise hardware and equipment via DSLAM 120 to establish communications. Another central office 167 connects with calling party telephone 170 (having a communications address of 404-555-1277) and communications are routed via the telecommunications network 160, SSW complex 150, and/or the data network 140 to establish a VoN communications connection among the calling party telephone 170 and VoN-1 communications device (e.g., analog phones 123 and 124) and/or VoN-2 communications device (e.g., personal computer 112 HPNA 115, phones 113 and 114, and modem 115).

Exemplary Embodiment

Figure 2:
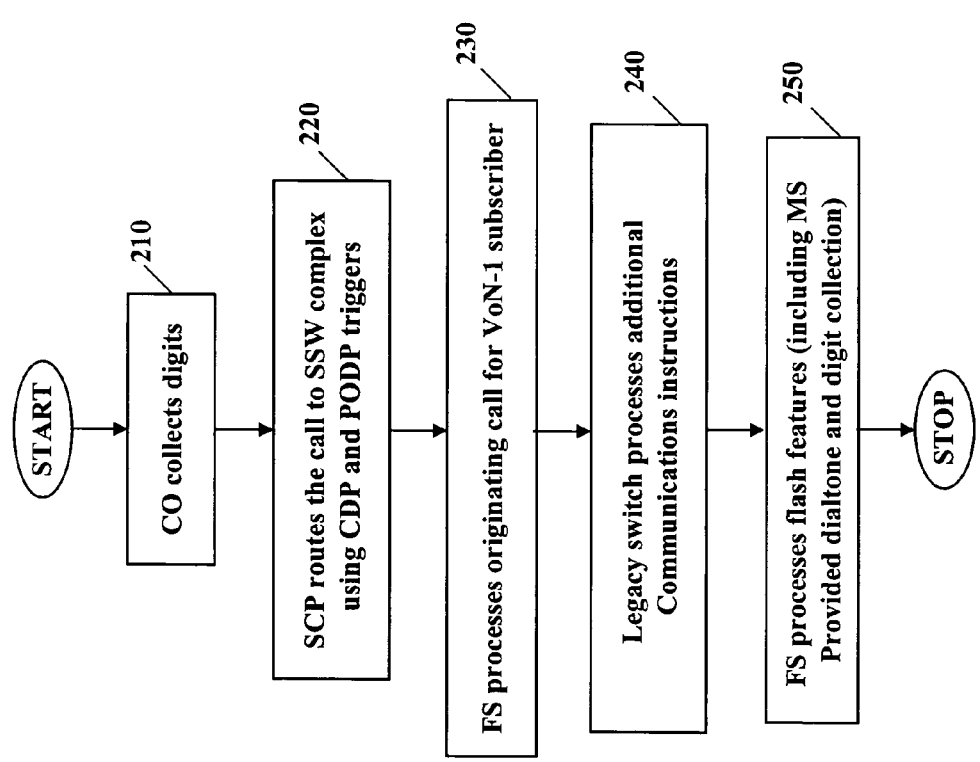
FIG. 2 illustrates a flow chart for an overview of an exemplary central office hotline and application server with line gateway functionality according to some of the embodiments of this invention.

Central Office Hotline having Application Server with enhanced Line Gateway Functionality FIG. 2 illustrates the main processing steps for an exemplary architect of a central office hotline and next generation application server enhanced with line gateway functionality. The central office 165 collects the communications address dialed by a user of one of the customer premise communications devices of VoN-1, shown as analog phones 123 and 124 [step 210]. Thereafter, the SCP 166 routes the communication to the SSW complex 150 using telephony triggers, such as, for example, Cisco discovery protocol (CDP), public office dialing plan (PODP), and others [step 220]. The FS 153 processes the originating call for the user of analog phones 123 and 124 [step 230]. The legacy switch 165 may process additional communications instructions, such as, for example, flash based features including three way calling, call transfer, and/or call waiting [step 240]. Thereafter the FS 153 processes the flash feature(s) including the Media Server 152 provided dial tone and digit collection [step 250].

The following information is used for the purpose of describing an incoming and/or an outgoing call for the exemplary embodiment. The POTS Subscriber Number is 404-222-1111 before VoN service is enabled for phones 123 and/or 124. When the subscriber of phone 123 and/or 124 becomes a VoN customer, the POTS Subscriber Number is ported and becomes the VoN number 404-222-1111 identified with SSW's line routing number (LRN) and provisioned on the AS platform. After porting the VoN number 404-222-1111 to the VoN service provider, such as a competitive local exchange carrier (CLEC), the VoN subscriber gets an additional internal communications address assigned on the legacy switch 165—the Shadow Line Number or Secret Line Number (SLN)—404-222-1234. This number is not known to the subscriber. As used herein, the terms "subscriber," "customer," and/or "user" are used interchangeably. The legacy switch 165 routes the call to the SSW complex 150 using the SLN as the calling number. The caller name (CNAM) and message waiting indicator (MWI) are assigned at the legacy switch 165 serving the VoN subscriber. All other features are provided by the FS 153. The SSW 155 is configured as a shared device type, such as a session initiation protocol (SIP) Non-Registering Gateway. The VoN customer's communications device (e.g., telephone 123 or 124) is set to the softswitch device 155 with the line port set to the SLN. The communications address of the phone is set to the VoN number. Flash services, such as, for example, call waiting, three-way calling, call transfer, and consultation hold are supported by the FS 153 with the trunk gateway 161 interpreting a digit sequence as a flash and then reporting that sequence back to the FS 153. And, the MS 152 provides the dial tone and collects digits following the flash.

Figure 3:
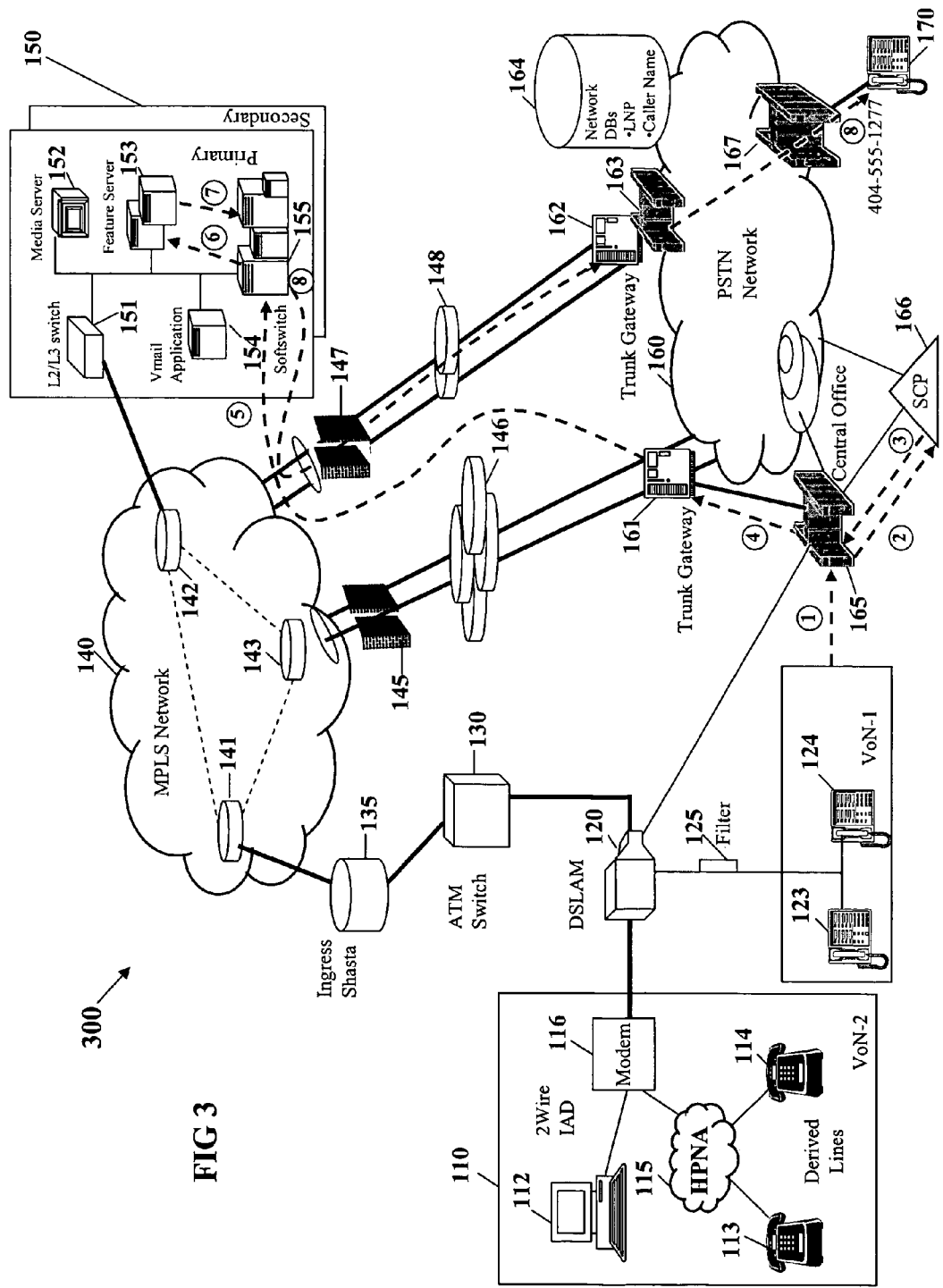
FIG. 3 illustrates an exemplary operating environment for an outgoing call to a central office hotline and application server with line gateway functionality according to some of the embodiments of this invention.
Figure 4:
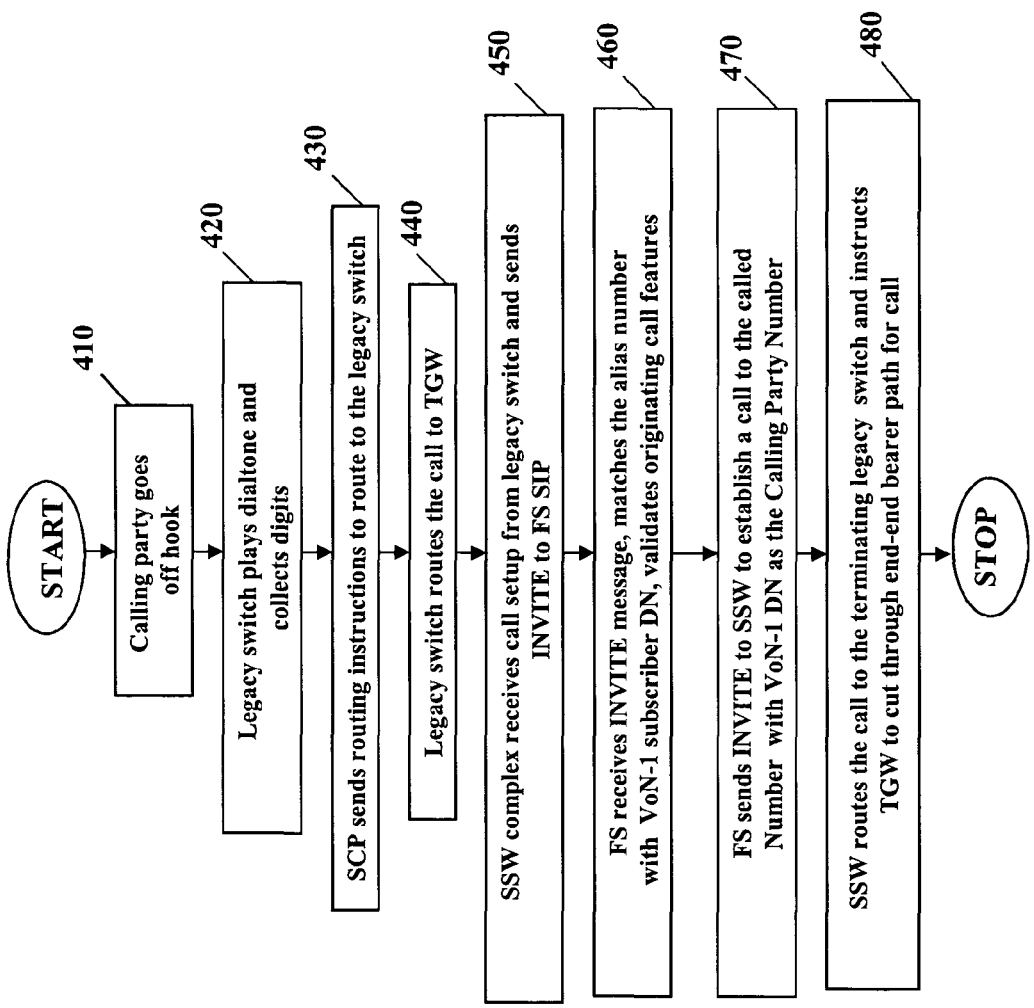
FIG. 4 illustrates a flow chart for an outgoing call to a central office hotline and application server with line gateway functionality according to some of the exemplary embodiments of this invention.

A typical outgoing call is handled according to the routing shown in FIG. 3 and the flow chart of FIG. 4. In FIG. 3, routing of the outgoing call is represented by dashed lines. In this exemplary embodiment, an outgoing call is placed from VoN-1 Subscriber to a called number 404-555-1277 of telephone 170. The VoN-1 number is 404-222-1111 which is ported to the SSW complex 150 and provisioned on the FS 153 to an internal communications address—the SLN number of 404-222-1234 (provisioned on legacy switch 165 and Feature Server 153). First, the communications device 123 and/or 124 of the calling party goes off hook [step 410] and the legacy switch 165 plays a dial tone and collects the digits of the called number via an off-hook detection (OHD) trigger

[step 420]. Next, the SCP 166 sends routing instructions to the legacy switch 165 (e.g., Transaction Capabilities Application Part (TCAP): TG=Trunk Group ID connected to TGW, Calling Party Number=SLN 404-222-1234; Called Party Number=dialed digits 404-555-1277) [step 430]. The legacy switch 165 then routes the call to the TGW 161 (IAM: Calling Party Num=SLN (e.g., the internal communications address) 404-222-1234, Called Party Number=dialed digits 404-555-1277) [step 440] and the SSW complex 150 receives the call setup from the legacy switch 165 and sends an invite to the FS 153 (e.g., SIP INVITE (Uniform Resource Identifiers (URI)=404-555-1277@NS.com, From: 4042221234@hiQ.com, To: 404-555-1277@NS.com) [step 450]. Thereafter, the FS 153 receives the invite message, matches the SLN alias number 404-222-1234 with VoN-1 subscriber DN 404-222-1111, and validates the originating call features [step 460]. The FS 153 then sends the invite to the SSW 155 to establish a call to the called number with VoN-1 DN as the Calling Party Number (e.g., SIP:INVITE(URI=404-555-1277@hiQ.com, From: 404-222-1111@AS.com, To: 404-555-1277@NS.com) [step 470]. Finally, the SSW 155 routes the call to the terminating telecommunications legacy switch 163 and instructs the TGW 162 to cut through end-end bearer path for call.

According to the embodiments depicted in FIGS. 3 and 4, the FS 153 or the SSW complex 150 may provide the following functionality: recognizes the originator, accepts invite, provides dial tone, collects digits, processes digits for out calls and original features, establishes end to end (ETE) calls, and processes mid-call features (e.g., 3way, Call Waiting, CallerID, Hold, etc.). And, the legacy switch provides a media gateway controller.

Figure 5:
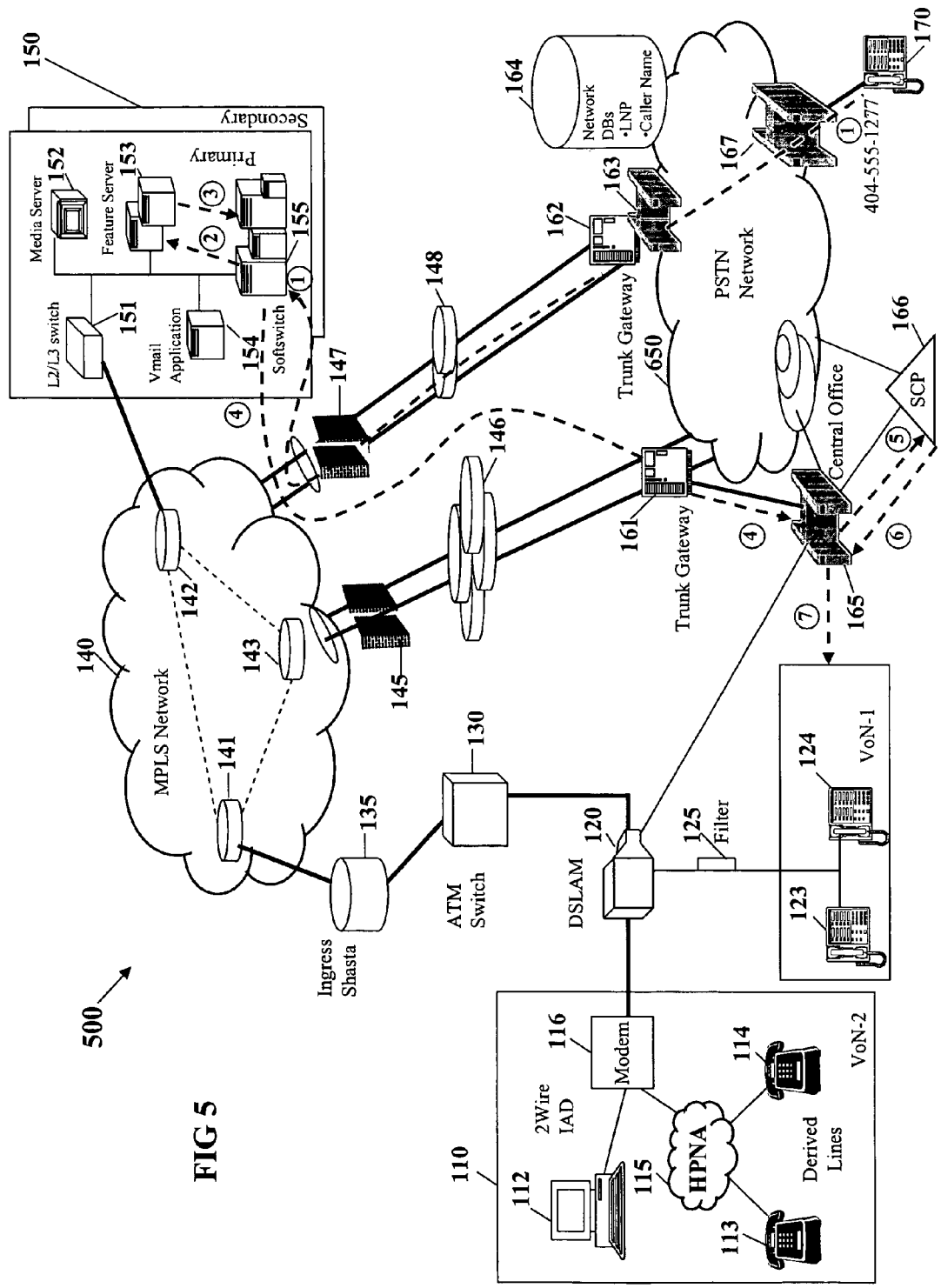
FIG. 5 illustrates an exemplary operating environment for an incoming call to a central office hotline and application server with line gateway functionality according to some of the embodiments of this invention.
Figure 6:
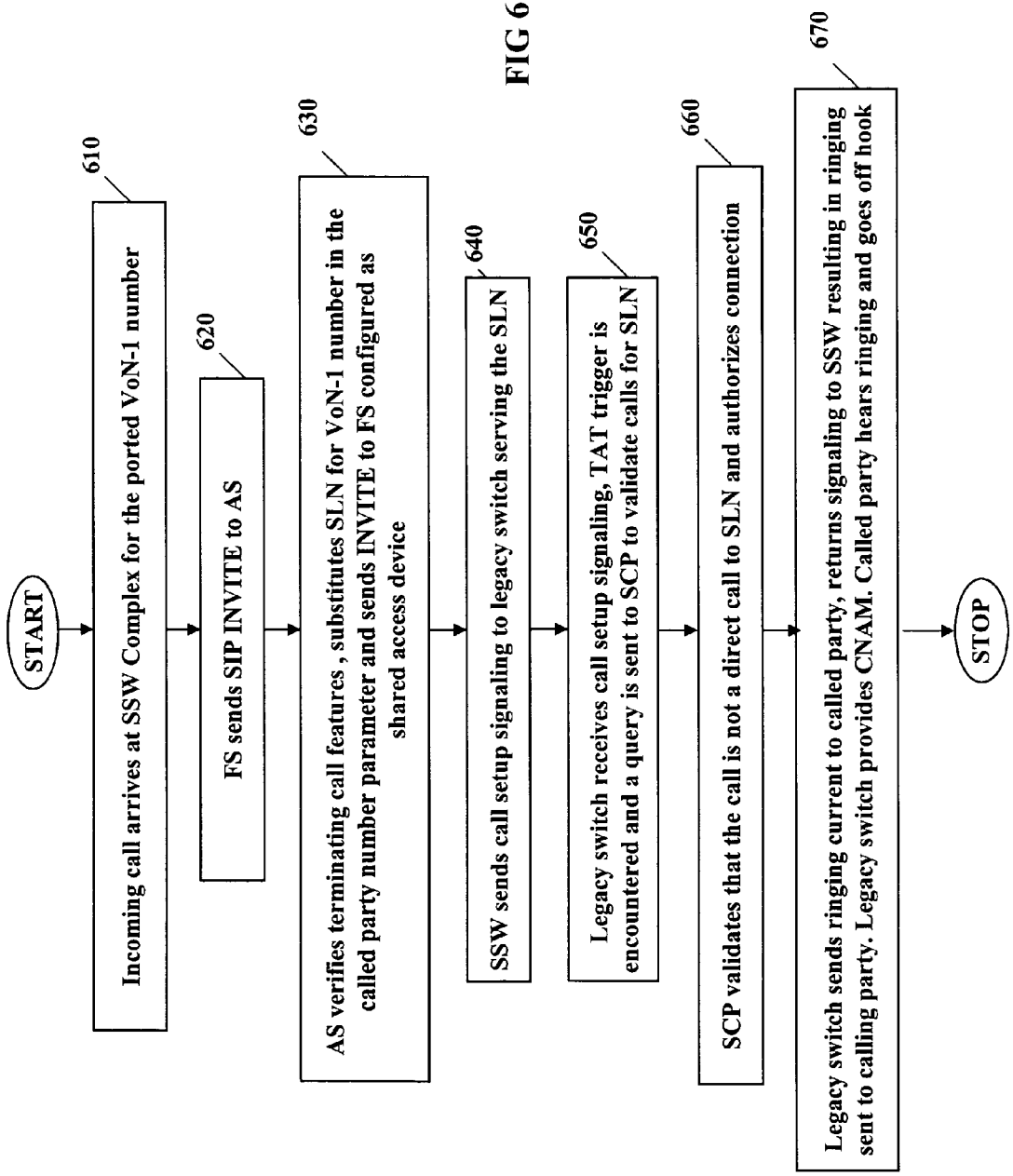
FIG. 6 illustrates a flow chart for an incoming call to a central office hotline and application server with line gateway functionality according to some of the exemplary embodiments of this invention.

A typical incoming call is handled according to the routing shown in FIG. 5 and the flow chart of FIG. 6. Routing of the incoming call is represented in FIG. 5 by dashed lines. In this exemplary embodiment, an incoming call to VoN-1 subscriber is placed by caller 404-555-1277 from phone 170. The VoN-1 number is 404-222-1111 and is ported to the SSW complex 150 and is provisioned on the FS 153. The SLN number is 404-222-1234 and is provisioned on the legacy switch 165 and the FS 153. The incoming call arrives at the SSW complex 150 for the ported VoN-1 number 404-422-1111 (e.g., Initial Address Message (IAM): Calling Party Number=404-555-1277, Called Party Number=404-222-11111) [step 610] and the FS 153 sends an SIP invitation message to the AS 155 (e.g., SIP INVITE (URI=404-222-1111@NS.com, From: 404-555-1277@hiQ.com, To: 404-222-1111.@NS.com) [step 620]. The FS 153 verifies the terminating call features, substitutes the SLN 404-222-1234 for VoN-1 number 404-222-1111 in the called party number parameter and sends the invitation message to the FS 153 configured as the shared access device [step 630]. The FS 153 maintains call state (e.g., INVITE (URI=4042221234@hiQ.com, From: 404-555-1277@AS.com, To: 4042221234 @hiQ.com). Next, the SSW 155 sends the call setup signaling to the legacy switch 165 serving the SLN (e.g., IAM: Calling Party Num=404-555-1277, Called Party Number=4042221234) [step 640] Then, the legacy switch 165 receives the call setup signaling, and a telephony trigger, such as the transatlantic telecommunications trigger (TAT), is encountered and a query is sent to the SCP 166 to validate calls for the SLN [step 650]. Thereafter, the SCP 166 validates that the call is not a direct call to the SLN and authorizes connection (e.g., Transaction Capabilities Application Part (TCAP): Calling Party Number=404-555-1277, Called Party Number=4042221234) [step 660]. Finally, the legacy switch 165 sends a ringing current to called party and returns signaling to SSW 155 resulting in ringing sent to the phone 170 of the calling party. The legacy switch 165 provides CNAM and the called party hears ringing at telephone 123 and/or 124 and goes off hook [step 670].

Exemplary Embodiment

Central Office Hotline having Direct Tie Line Functionality

Figure 7:
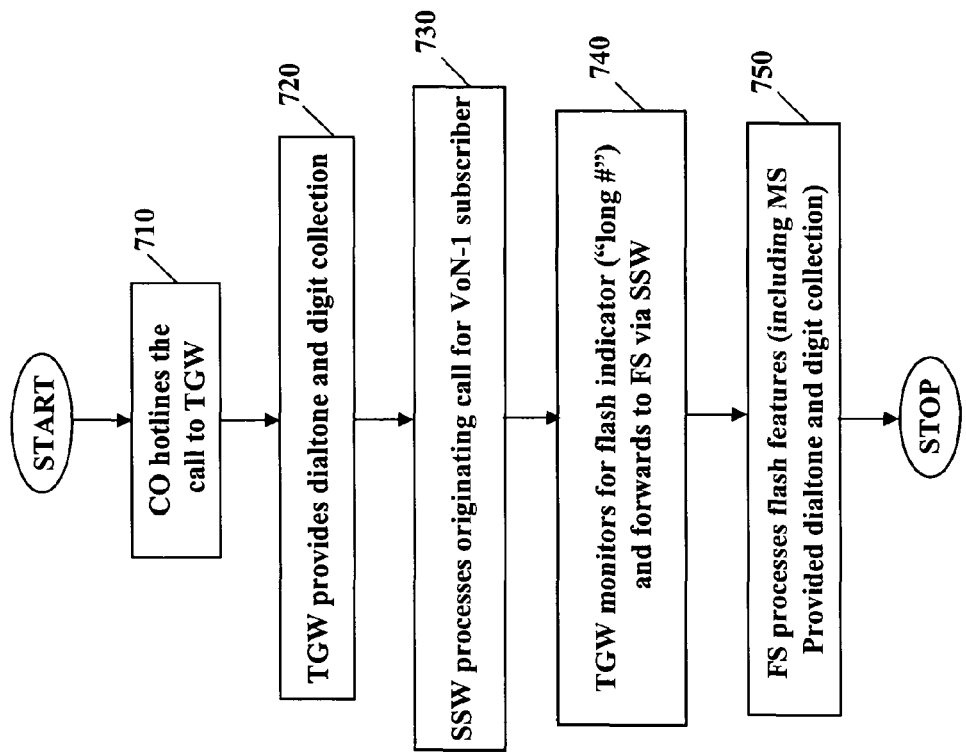
FIG. 7 illustrates a flow chart for an overview of an exemplary central office hotline with direct tie line functionality according to some of the embodiments of this invention.

FIG. 7 illustrates the main processing steps for an exemplary architect of a central office hotline having direct tie line functionality. The central office 165 hotlines the call to the TGW 161 [step 710] and the TGW 161 provides a dial tone and digit collection of the subscriber's communications device [step 720]. Thereafter, the SSW complex 150 processes the originating call for the VoN-1 subscriber [step 730] and the TGW 161 monitors for a flash indicator and forwards the digits to the FS 153 [step 740]. The FS 153 processes the flash features (including the dial tone and digit collection) [step 750].

The following information is used for the purpose of describing an incoming and/or an outgoing call for the exemplary embodiment. The POTS Subscriber Number is 404-222-1111 before VoN service is enabled for phones 123 and 124. When the subscriber of phone 123 and/or 124 becomes a VoN customer, the POTS Subscriber Number is ported and becomes the VoN number 404-222-1111 identified with SSW's LRN and provisioned on the FS 153. After porting the VoN number 404-222-1111 to CLEC, the VoN subscriber gets an additional communications address assigned on the switch—the Shadow Line Number or Secret Line Number (SLN)-404-222-1234. This number is not known to the subscriber. As used herein, the terms "subscriber," "customer," and/or "user" are used interchangeably. The CNAM and MWI are assigned at the legacy switch 165 serving the VoN subscriber. All other features are provided by the FS 153. The SSW 155 is configured as a shared device type—SIP Non-Registering Gateway. The customer communications device (e.g., telephone 123 and 124) is set to the softswitch device with the line port set to the SLN. The communications address of the phone is set to the VoN-1 number. Flash services, such as, for example, call waiting, three-way calling, call transfer, and consultation hold are supported by the FS (e.g., 153) with the trunk gateway interpreting a digit sequence as a flash and then reporting that sequence in an information method to the FS. And, the MS provides the dial tone and collects digits following the flash.

Figure 8:
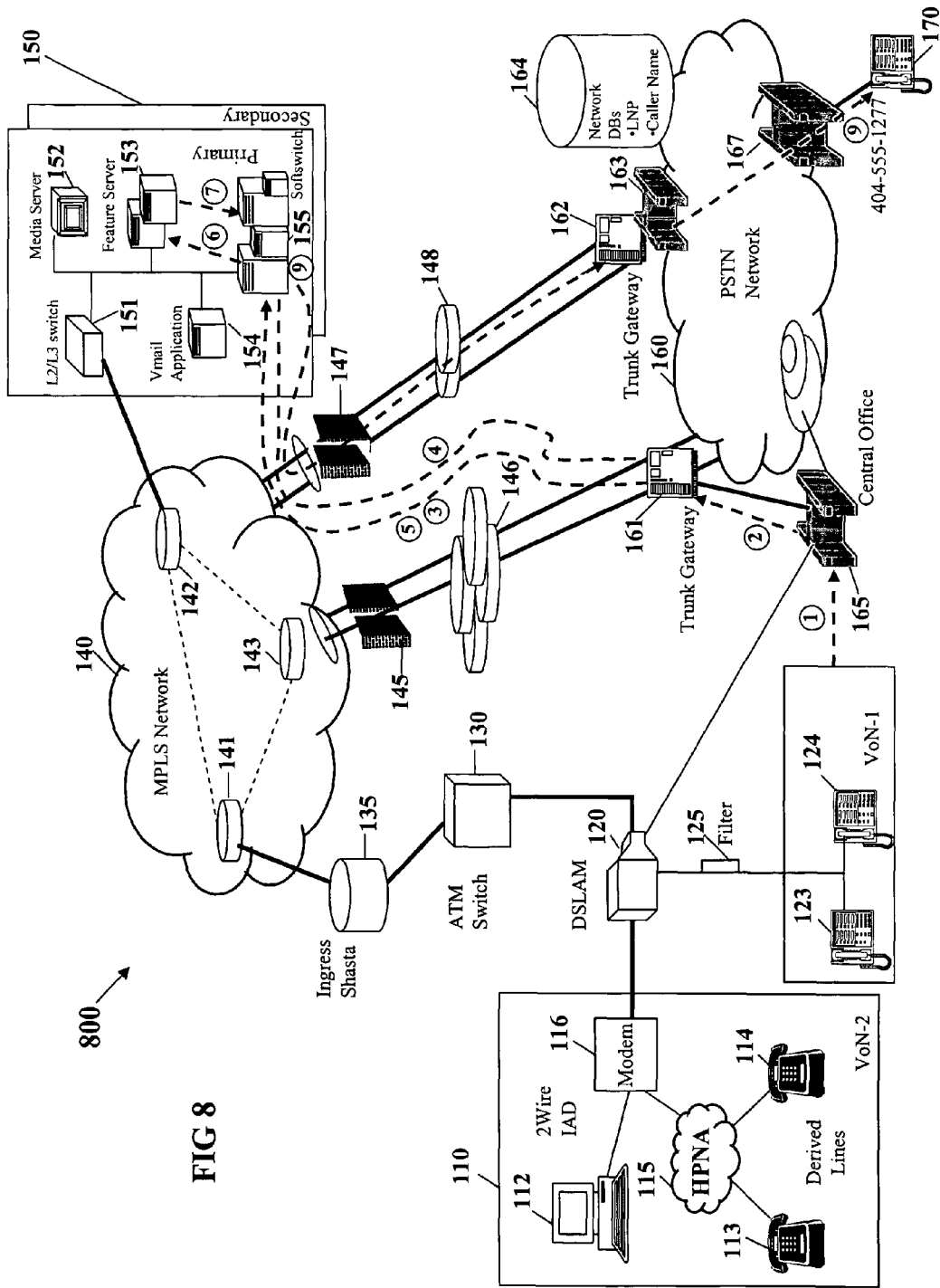
FIG. 8 illustrates an exemplary operating environment for an outgoing call to a central office hotline with direct tie line functionality according to some of the embodiments of this invention.
Figure 9:
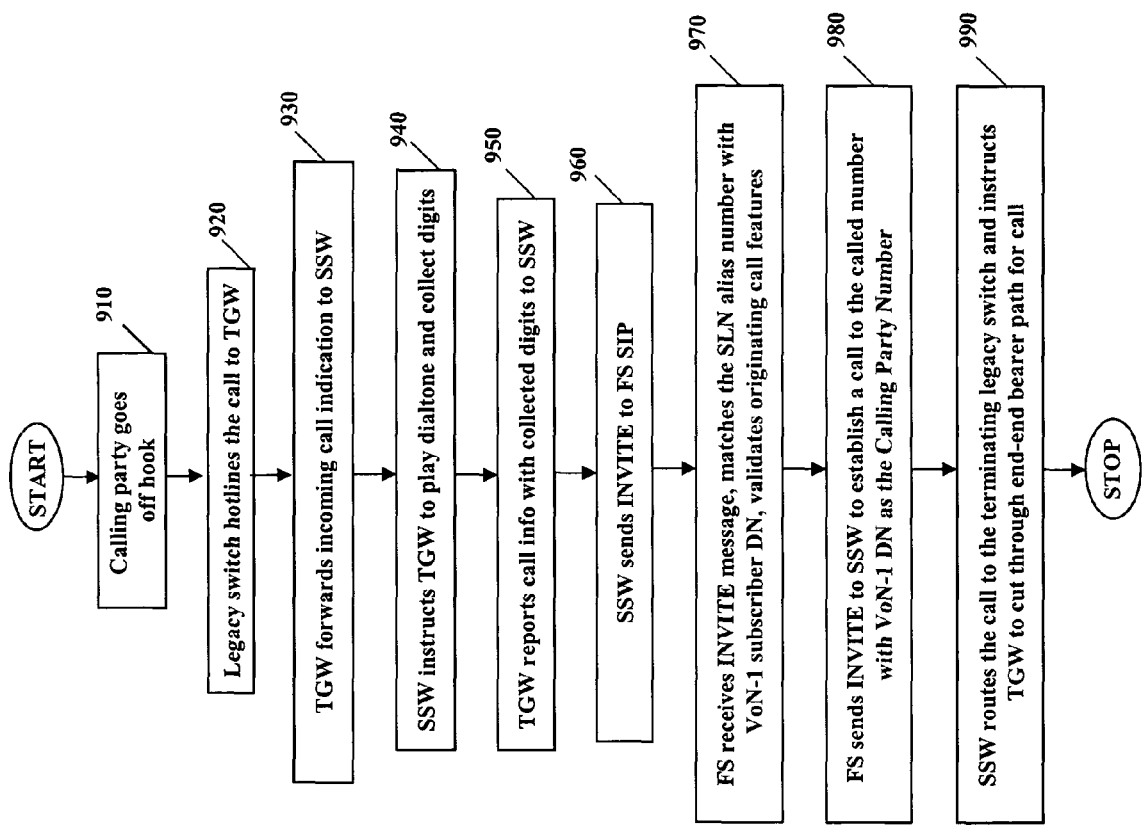
FIG. 9 illustrates a flow chart for an outgoing call to a central office hotline with direct tie line functionality according to some of the exemplary embodiments of this invention.

A typical outgoing call is handled according to the routing shown in FIG. 8 and the flow chart of FIG. 9. Routing of the outgoing call is shown in FIG. 8 as dashed lines. In this exemplary embodiment, an outgoing call is placed from VoN-1 Subscriber to a called number 404-555-1277, the VoN-1 number is 404-222-1111 (ported to the SSW and provisioned on the Application server), the SLN number=404-222-1234 (provisioned on the legacy switch 165 and the FS 153), and the hotline number=770-333-1212 (provisioned on the SSW, one per calling area). The calling party goes off hook [step 910] and the legacy switch 165 hotlines the call to the TGW 161 via tandem switching (e.g., LAM: Calling Party Num=SLN 404-555-1277, Called Party Number=Hotline number 7703331212) [step 920]. The TGW 161 forwards the incoming call indication to the SSW complex 150 [step 830] and the SSW 155 instructs the TGW 161 to play the dial tone and collect digits [step 940]. Next, the TGW 161 reports call information with collected digits to the SSW 155 [step 950], and the SSW 155 sends an invitation message to the FS 153 (e.g., IVITE(URI=404-555-1277@NS.com, From: 4042221234@hiQ.com, To: 404-555-1277@NS.com) [step 960]. Thereafter, the FS 153 receives the invitation message, matches the SLN alias number 4042221234 with VoN-1 subscriber DN 404-422-11111, and validates the originating call features [step 970]. The FS 153 sends the invitation message to the SSW 155 to establish a call to the called number with VoN-1 DN as the Calling Party Number (e.g., SIP:INVITE(URI=404-555-1277@hiQ.com, From: 404-222-1111@AS.com, To: 404-555-1277 @NS.com) [step 980]. Finally, the SSW 155 routes the call to the terminating legacy switch 163 and instructs the TGW 162 to cut through end-end bearer path for call [step 990].

Figure 10:
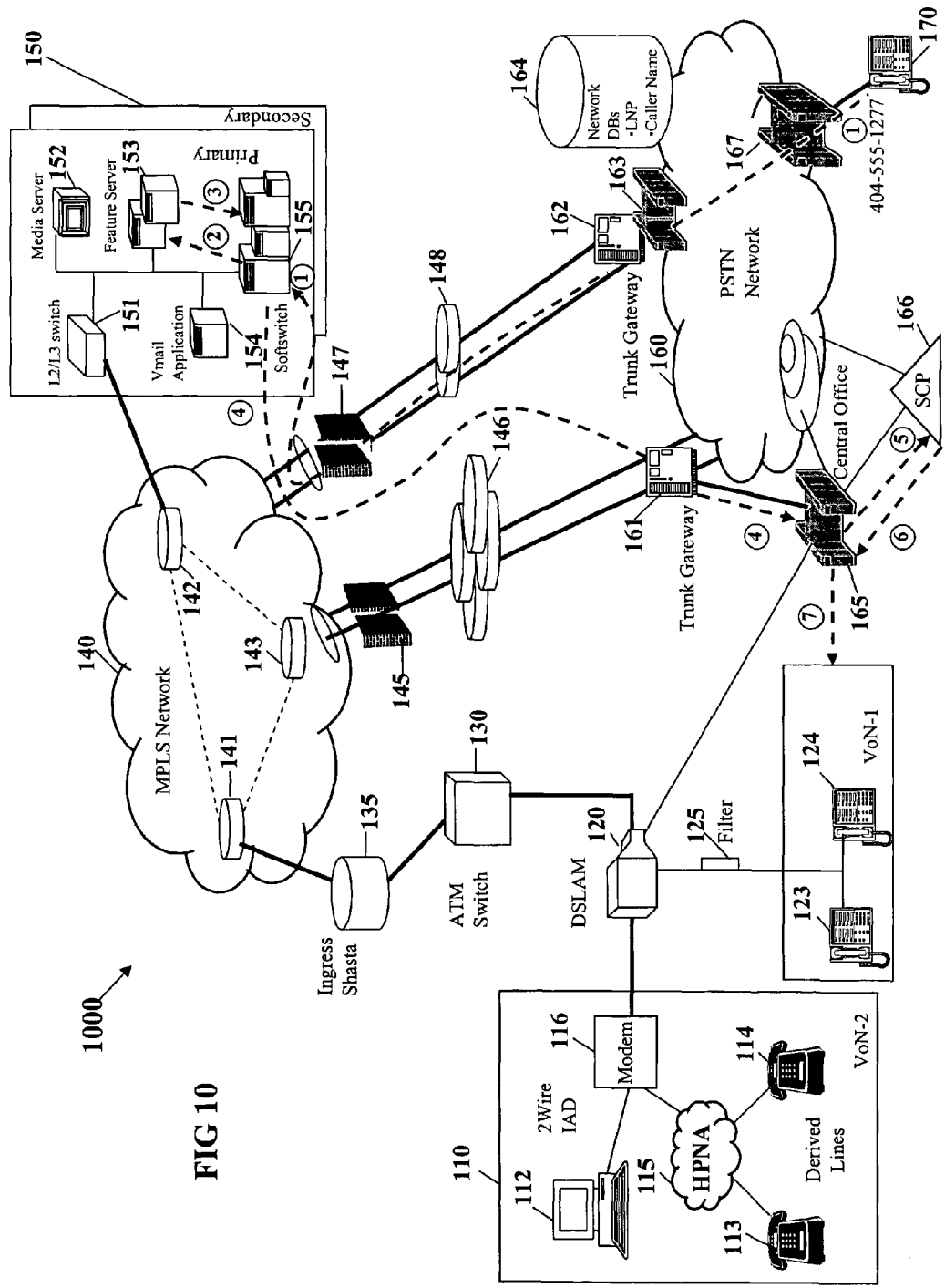
FIG. 10 illustrates an exemplary operating environment for an incoming call to a central office hotline with direct tie line functionality according to some of the embodiments of this invention.

A typical incoming call is handled according to the routing shown in FIG. 10 and the flow chart of FIG. 11. Routing of the incoming call is represented in FIG. 11 as dashed lines. In this exemplary embodiment, an incoming call to a VoN-1 subscriber is placed by caller 404-555-1277. The VoN-1 number is 404-222-1111 and is ported to the SSW 155 and is provisioned on the FS 153. The SLN number is 404-222-1234 and is provisioned on the legacy switch 165 and the FS 153. The incoming call arrives at the SSW complex 150 for the ported VoN-1 number 404-422-1111 (e.g., IAM: Calling Party Num=404-555-1277, Called Party Number=404-222-11111) [step 1110]. The SSW 155 sends an SIP invitation message to the FS 153 (e.g., INVITE(URI=404-222-1111@NS.com, From: 404-555-1277@hiQ.com, To: 404-222-1111@NS.com) [step 1120]. Next, the FS 153 verifies terminating call features, substitutes SLN 404-222-1234 for VoN-1 number 404-222-1111 in the called party number parameter, and sends an invitation message to the SSW 155 configured as a shared access device. The FS 153 maintains call state (e.g., SIP:INVITE message(URI=4042221234@hiQ.com, From: 404-555-1277@AS.com, To: 4042221234 @hiQ.com) [step 1130]. Next, the SSW 155 sends call setup signaling to the legacy switch 165 serving the SLN (e.g., IAM: Calling Party Num=404-555-1277, Called Party Number=4042221234) [step 1140] and the legacy switch 165 receives call setup signaling, the TAT trigger is encountered, and a query is sent to SCP 166 to validate calls for SLN [step 1150]. Thereafter, the SCP 166 validates that the call is not a direct call to SLN and authorizes connection (e.g., TCAP: Calling Party Number=404-555-1277, Called Party Number=4042221234) [step 1160]. Finally, the legacy switch 165 sends ringing current to called party and returns signaling to the SSW 155 that results in ringing sent to calling party. The legacy switch 165 provides CNAM and the called party hears ringing and goes off hook [step 1170].

While this invention has been described with respect to various features, aspects, and embodiments, those skilled and unskilled in the art will recognize this invention is not so limited. For example, the Application Server (AS) and the Service Control Point of the above described figures are shown as two stand alone components; however, AS and SCP may be a single, integrated component that includes functionalities of an application server and of a service control point to provide access to and signaling with voice and data networks. Other variations, modifications, and alternative embodiments may be made without departing from the spirit and scope of this invention.

ABBREVIATIONS & ADDITIONAL DESCRIPTIONS

AIN—Advanced Intelligent Network
AS—Application Server
ATA—Analog Telephone Adapter
ATM—Asynchronous Transfer Mode
CDP—Cisco Discovery Protocol
CdPN—Called Party Number
CgPN—Calling Party Number
CLEC—Competitive Local Exchange Number
CNAM—Calling Name
CO—Central Office
CODEC—Coder/Decoder; converts a voice grade analog signal to a u-law or A-law encoded samples at an 8 KHz sampling rate; DSL bypasses the CODECs at the CO by separating the frequencies in a POTS splitter and passing the DSL signal to a DSLAM, the DSL equivalent of a CODEC
CPE—Customer Premises Equipment
DN—Directory Number
DSL—Digital Subscriber Line
DSLAM—Digital Subscriber Line Access Multiplexer; a mechanism at a phone company's central location that links many customer DSL connections to a single high-speed ATM line.
ETE—end to end
FS—NGN Application Server provides features for VoN lines (in the SoftSwitch Complex)
HPNA—Home Phoneline Networking Alliance
IAD—Integrated Access Device
IAM—Initial Address Message
IP—Internet Protocol
IP Telephony—Internet Protocol Telephony
ISP—Internet Service Provider
LRN—Location or Line Routing Number
MLT—Mechanized Loop Testing
MS—Media Server
LGW—Line Gateway; functions include providing dial-tone, collects digits, SIP, and RTP traffic.
MPLS—MultiProtocol Label Switching
MWI—Message Waiting Indicator
NGN—Next Generation Network
OAM&P—Ordering, Administration, Maintenance and Provisioning
OHD—Off-hook Detection
PODP—Public Office Dialing Plan
POTS—Plain Old Telephone Service (this number gets ported to VoN (via AS))
PSTN—Public Switched Communications Network
RIB—Regional IP Backbone; provides core IP network for communication signals
ROI—Return on Investment
SCP—Service Control Point
SIP—Session Initiation Protocol
SLN—Secret Line Number or Shadow Line Number (i.e., the internal communications address) known by the CO and FS; non-published unique telephone number assigned by Class 5 switch to the VoN subscriber's local loop; known to the Class 5 switch; assigned to Class 5 switch after the original POTS number (i.e., the directory number) is ported; depending upon alternative chosen, it is used by the FS, SSW, SSW complex, SCP, etc.; SLN identifies the customer's local loop, the SLN is used for MLT testing.
SN—Service Node; SNs are used by industry for Intelligent Peripheral
SSW complex—NGN Softswitch Complex
TA—Terminal Adaptor
TAT—Transatlantic Telecommunications Trigger
TCAP—Transaction Capabilities Application Part, adds transaction based functionality to PSTN
TG—Trunk Group ID TGW—Trunk Gateway and/or Media Gateway
URI—Uniform Resource Identifiers
VoIP—Voice Over Internet Protocol
VoN—Voice-over Network Services
xATA—multi-line Analog Terminal Adapter

What is claimed is:

1. A method for providing a voice over network services, comprising:
   decoding a voice over network setup communications signal to associate an internal communications address with a directory communications address, the internal communications address corresponding to a voice over network service of the directory communications address;
   establishing a voice over network hotline for the directory communications address using the internal communications address, the voice over network hotline providing voice over internet protocol communications for communications with the directory communications address;
   presenting a dial tone to a communications device associated with the directory communications address, the dial tone indicating availability to communicate voice over internet protocol communications signals; and
   determining a called party's communications address from the directory communications address,
   wherein the internal communications address comprises a data format that is the same as a data format of the directory communications address,
   wherein the internal communications address further comprises a communications service feature of the directory communications address that includes a caller identification service feature, and
   wherein the internal communications address comprises a shadow line number that is unknown to a user that is associated with the directory communications address, wherein the shadow line number comprises a data format that is the same as the data format of the directory communications address.

2. The method of claim 1, further comprising:
   initiating a voice over network communications signal to the called party's communications address from the voice over network hotline; and
   establishing the voice over network communications signal from the directory communications address to the called party's communications address via the voice over network hotline.

3. A voice over network system comprising:
   means for decoding a directory communications address of a communications device to identify a voice over internet protocol service feature of the directory communications address via an association with an internal communications address that includes a same format as the directory communications address and wherein the internal communications address comprises a shadow line number that is unknown to a user that is associated with the directory communications address, wherein the shadow line number comprises a data format that is the same as the data format of the directory communications address, the communications device in communication with a telecommunications network, the means for decoding comprising a media server;
   means for establishing, using the internal communications address, a voice over network hotline to provide the voice over internet protocol service feature, the voice over network hotline communicating internet protocol telephony communications signals, the voice over network hotline further establishing an internet protocol telephony communications connection of the communications device with a called party's communications address; and
   means for decoding the directory communications address to identify a mid-call service feature of the directory communications address, the mid-call service feature comprising a three way call service feature,
   wherein the media server is operable to communicate the dial tone to the communications device via the bearer communications path, to receive the called party's communications address from the communications device via the bearer communications path, and to communicate the called party's communications address to the feature server.

4. The system of claim 3, wherein the means for decoding the directory communications address to identify a voice over internet protocol service feature of the directory communications address comprises a feature server and an application server.

5. The system of claim 4, the voice over network hotline further comprising a media gateway, the application server, a media server, the feature server, and means for communicating among the media gateway, the application server, and the feature server.

6. The system of claim 5, the means for communicating between the media gateway, the application server, and the feature server comprising an internet protocol telephony switching device.

7. The system of claim 6, the media gateway communicating with the internet protocol telephony switching device to initiate setup of the voice over network hotline.

8. The system of claim 7, the feature server communicating with the application server to establish a bearer communications path from the media server to the media gateway, the feature server further instructing the media server to communicate a dial tone to the media gateway and further instructing the media gateway to communicate the called party's communications address.

9. The system of claim 3, the application server initiating communication of the internet protocol telephony communications signal to the called party's communications address and instructing the media gateway to establish the internet protocol telephony communications connection of the communications device with a called party's communications address via the bearer path.

10. The system of claim 8, the means for decoding the directory communications address of the communications device further detecting the voice over network hotline and communicating the bearer path to the media gateway.

11. The system of claim 10, the means for decoding the directory communications address of the communications device using a direct tie line via in-band signaling to the media gateway.

12. The system of claim 11, the media gateway communicating with the internet protocol telephony switching device to initiate communications setup, the internet protocol telephony switching device communicating with the application server to establish communications with the bearer communications path via the media server, and the application server further instructing the media server to communicate the dial tone to the called party's communications address.

13. The system of claim 12, the media server communicating the dial tone to the communications device via the direct tie line.

14. The system of claim 13, the media server receiving the called party's communications address from the communications device via the direct tie line and communicating the called party's communications address to the application server.

15. The system of claim 14, the application server initiating communication of the internet protocol telephony communications signal to the called party's communications address and instructing the internet telephony switching device to route the internet protocol telephony communications signal to the media server to establish the internet protocol telephony communications connection of the communications device with a called party's communications address.

16. A computer program product comprising a non-transitory computer readable medium having computer readable program code embodied therein, the computer readable program product comprising:

computer readable program code to decode a voice over network setup communications signal to associate an internal communications address with a directory communications address, the internal communications address comprising a voice over network service of the directory communications address and including a data format that is the same as a data format of the directory communications address;

computer readable program code to establish, using the internal communications address, a voice over network hotline for the directory communications address, the hotline providing voice over internet protocol communications for communications with the directory communications address;

computer readable program code to present a dial tone to a communications device of the directory communications address, the dial tone indicating availability to communicate voice over internet protocol communications signals; and computer readable program code to receive a called party's communications address from the directory communications address, wherein the internal communications address further comprises a communications service feature of the directory communications address that includes a voicemail service feature, and wherein the internal communications address comprises a shadow line number that is unknown to a user that is associated with the directory communications address, wherein the shadow line number comprises a data format that is the same as the data format of the directory communications address.

17. A computer program product according to claim 16, further comprising:

computer readable program code to initiate a voice over network communications signal to the called party's communications address from the hotline; and computer readable program code to establish the voice over network communications signal from the directory communications address to the called party's communications address via the voice over network hotline.

* * * * *